US007855778B2

(12) United States Patent
Yung et al.

(10) Patent No.: US 7,855,778 B2
(45) Date of Patent: Dec. 21, 2010

(54) METHOD AND APPARATUS FOR LOCATING AND MEASURING THE DISTANCE TO A TARGET

(75) Inventors: Wai Lam Yung, Lam Tin (HK); Wilfried Alois Anton Bittner, Tsing Yi (HK); Yat Wah Lam, Kowloon (HK); Sai Chak Chan, N.T. (HK); Wah Pong Chan, N.T. (HK); Kwong Lam Ng, Kowloon (HK); Thomas Paul Richard Zimmermann, Munich (DE)

(73) Assignee: Robert Bosch Company Limited, Hong Kong (CN)

( * ) Notice: Subject to any disclaimer, the term of this patent is extended or adjusted under 35 U.S.C. 154(b) by 0 days.

(21) Appl. No.: 11/796,621

(22) Filed: Apr. 27, 2007

(65) Prior Publication Data

US 2008/0266541 A1 Oct. 30, 2008

(51) Int. Cl.
*G01C 3/08* (2006.01)

(52) U.S. Cl. .................. 356/4.01; 356/3.01; 356/3.1; 356/3.15; 356/4.1

(58) Field of Classification Search ......... 356/4.01–4.1, 356/3.01–3.15, 5.01–5.15, 6–22, 28, 28.5
See application file for complete search history.

(56) References Cited

U.S. PATENT DOCUMENTS

| 5,026,158 | A | * | 6/1991 | Golubic ................. 356/252 |
| 5,221,956 | A | | 6/1993 | Patterson et al. |
| 5,652,651 | A | | 7/1997 | Dunne |
| 5,700,084 | A | * | 12/1997 | Yasukawa et al. ......... 362/275 |
| 5,841,126 | A | | 11/1998 | Fossum et al. |

(Continued)

FOREIGN PATENT DOCUMENTS

WO    WO 99/31516    6/1999

OTHER PUBLICATIONS

Hilti Corporation, PD30 Operating Instructions, 2003.

(Continued)

*Primary Examiner*—Thomas H Tarcza
*Assistant Examiner*—Luke D Ratcliffe
(74) *Attorney, Agent, or Firm*—Greer, Burns & Crain, Ltd.

(57) ABSTRACT

Embodiments of the invention comprise an apparatus for use with a laser range finder configured to direct a laser beam toward a scene to measure the distance to a target in the scene and having a range finder display for displaying data, including data that is indicative of the distance to a target, wherein the apparatus comprises a protective housing, a camera module in the housing, the camera module including a lens mounted in a front end portion of the housing, and a light path through the lens to image sensor, an image sensor operatively connected to the camera module for receiving images acquired by the camera module, electronic memory for selectively storing data of images from the image sensor, circuitry for controlling the operation of the image sensor and the memory, a camera display in the housing operatively connected to the image sensor for receiving the image data and providing a visual display of the image, and a switch for storing image data in the memory. Other embodiments include a projector in the housing for projecting the data displayed by the second display onto the image sensor to thereby capture the image data of the scene and displayed distance data together.

23 Claims, 14 Drawing Sheets

U.S. PATENT DOCUMENTS

| | | | |
|---|---|---|---|
| 5,845,165 A * | 12/1998 | McMahan | 396/426 |
| 6,023,322 A | 2/2000 | Bamberger | |
| 6,310,682 B1 | 10/2001 | Gavish et al. | |
| 6,456,793 B1 * | 9/2002 | Ray et al. | 396/89 |
| 7,053,993 B2 | 5/2006 | de Virel | |
| 7,193,692 B2 | 3/2007 | Huang | |
| 2004/0012770 A1 * | 1/2004 | Stierle et al. | 356/4.01 |
| 2004/0130702 A1 * | 7/2004 | Jupp et al. | 356/5.01 |
| 2004/0135992 A1 * | 7/2004 | Munro | 356/4.01 |
| 2006/0125924 A1 | 6/2006 | Ing-Song et al. | |
| 2006/0152704 A1 * | 7/2006 | Bani-Hashemi | 356/3.1 |
| 2007/0252974 A1 * | 11/2007 | Dimsdale | 356/5.01 |
| 2007/0277421 A1 * | 12/2007 | Perkins et al. | 42/122 |

OTHER PUBLICATIONS

Leica Geosystems, Leica DISTO™ brochure, 2005.
RoboToolz®, RoboTape® Model RT-9000 User Guide, Nov. 2005.

* cited by examiner

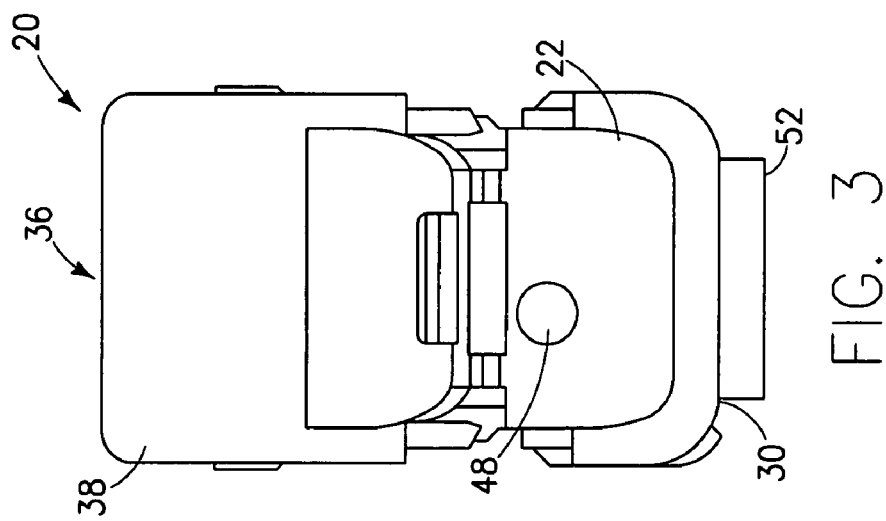
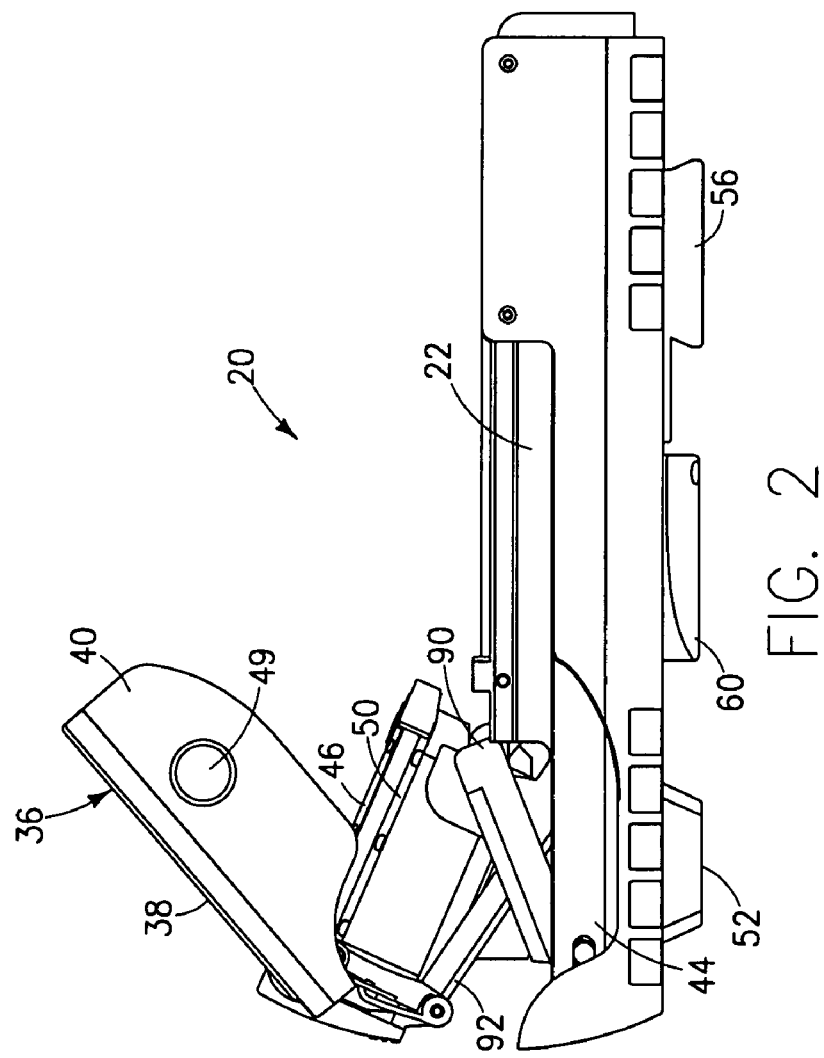

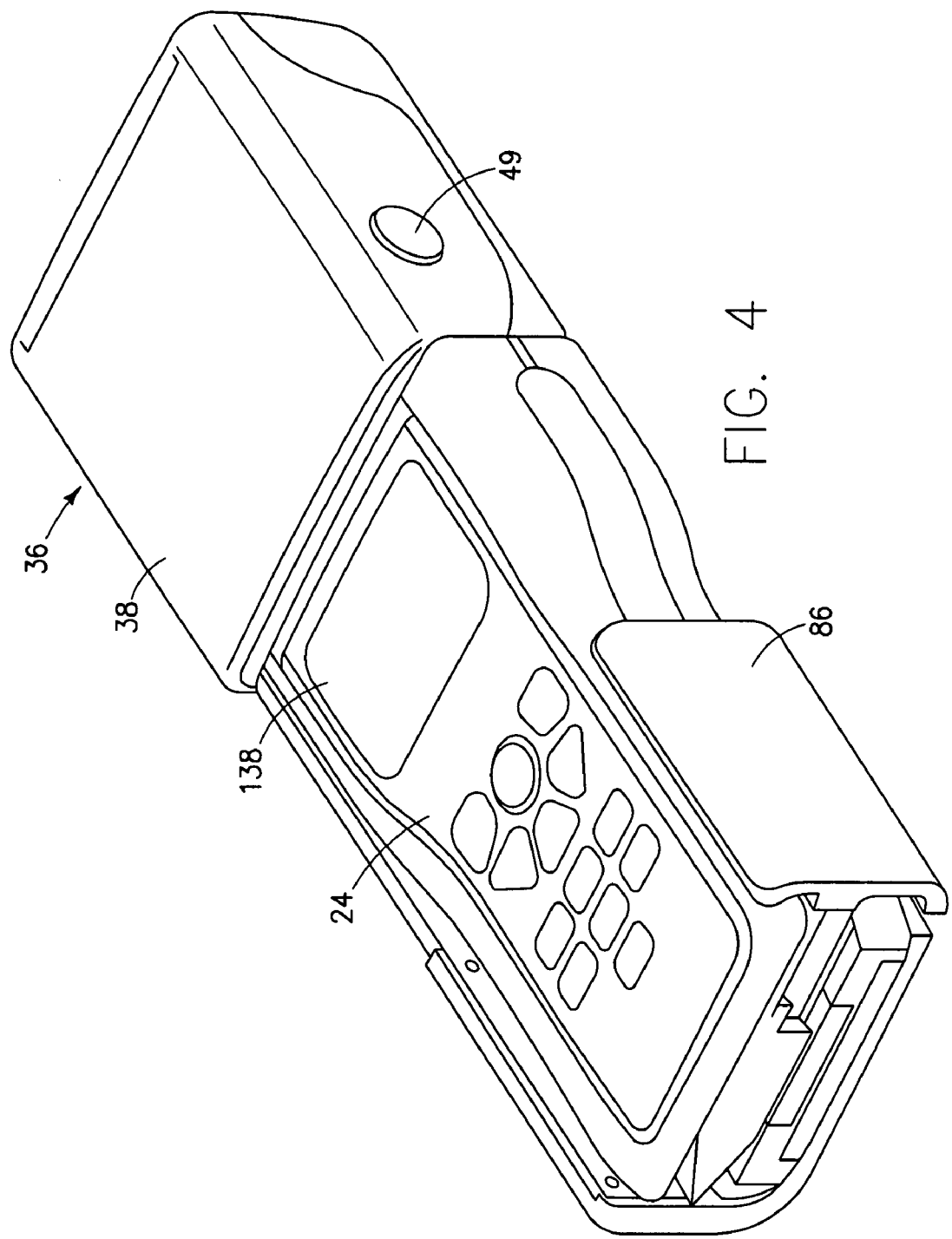

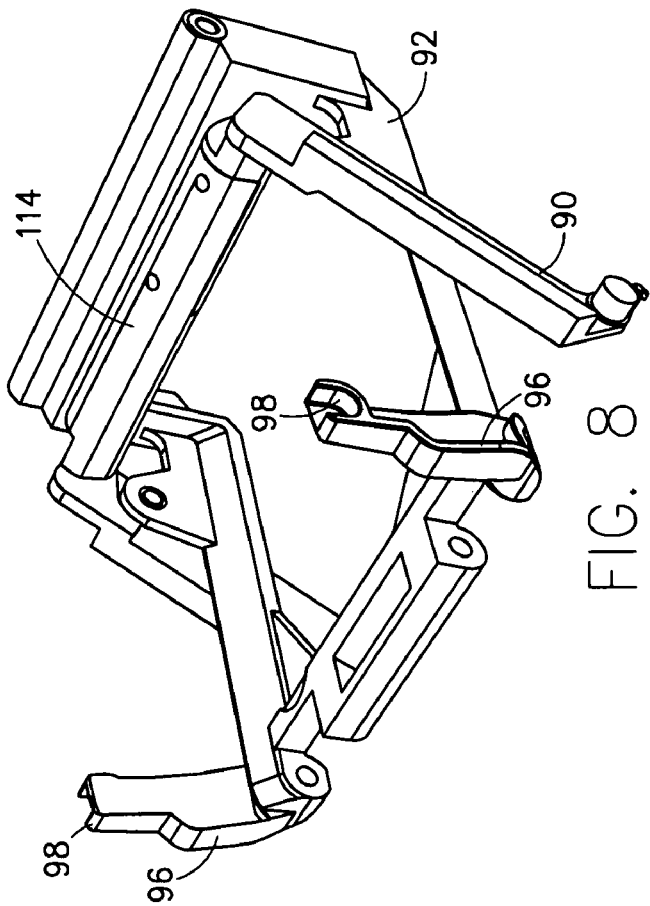
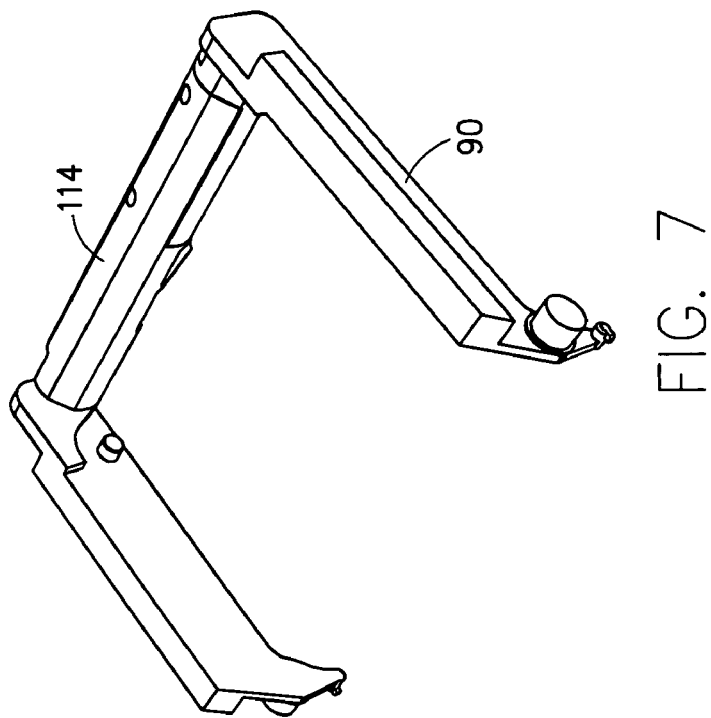

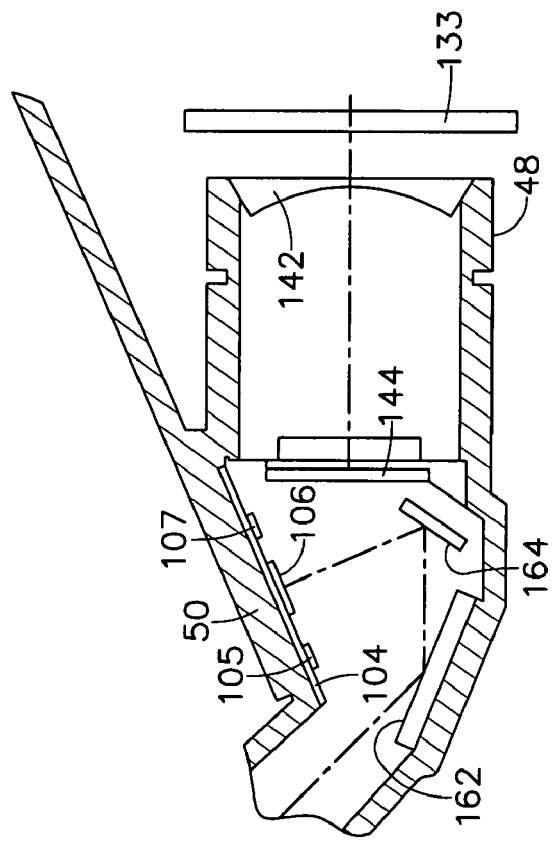
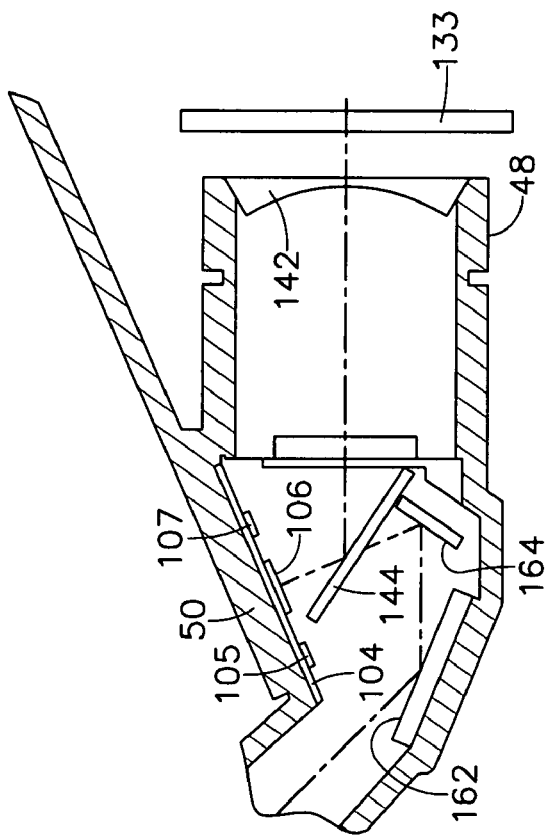

METHOD AND APPARATUS FOR LOCATING AND MEASURING THE DISTANCE TO A TARGET

BACKGROUND OF THE INVENTION

The present invention generally relates to the use of lasers for measuring distances to a target.

It is common practice to use laser range finders to determine distances to a target that may be close or several hundred yards. The laser range finders are generally of two types, one of which is a phase shifting electronic measurement while the other measures the elapsed time for a signal to be propagated, reflected and detected. A common feature of either type of operation is the use of a laser beam directed to the target so that the user knows what precise target for which distance is being measured. While there is generally no difficulty in seeing where the laser spot impinges on a surface when used indoors, the ability to view a laser spot can be severely compromised in bright sunlight and at longer distances.

Some range finder users wear red colored eye glasses that can aid one to see the red laser spot in bright light conditions, while other users often also employ telescopes or other magnification to enlarge the target. Even with these aids, it is often difficult to see the laser spot. If the range finder is being used to provide important measurements, such as may be required in a construction project for example, it is important to know exactly what the target is so that the measured distance is the distance from the rangefinder to the real target of interest.

Very minor angular movement of the laser beam can greatly change the distance measurement that is being taken, particularly if a small change of angle changes the actual target that is being measured. For example, a user may want to measure the distance to a narrow column that may be several yards in front of a wall, so if the user is intending to measure the distance to the column and is actually measuring the distance to the wall, a few degrees of misalignment can result in measurement errors that can have significant adverse consequences. Even when the measurements are correct for the intended target, it can be cumbersome to provide an accurate record and description of a series of measurements.

SUMMARY OF THE INVENTION

Embodiments of the invention comprise an apparatus for use with a laser range finder configured to direct a laser beam toward a scene to measure the distance to a target in the scene and having a range finder display for displaying data, including data that is indicative of the distance to a target, wherein the apparatus comprises a protective housing, a camera module in the housing, the camera module including a lens mounted in a front end portion of the housing, and a light path through the lens to image sensor, an image sensor operatively connected to the camera module for receiving images acquired by the camera module, electronic memory for selectively storing data of images from the image sensor, circuitry for controlling the operation of the image sensor and the memory, a camera display in the housing operatively connected to the image sensor for receiving the image data and providing a visual display of the image, and a switch for storing image data in the memory.

Another embodiment comprises an apparatus for finding a target and measuring the distance to the target that comprises a protective housing, a camera module in the housing, a lens mounted in a front end portion of the housing, and a light path through the lens, a first display in the housing operatively connected to the camera module for receiving the image data and providing a visual display of the image, an image sensor, an electronic memory for selectively storing data of images from the image sensor, control circuitry for controlling the image sensor and electronic memory to selectively acquire image data of a scene and store the same, a laser distance finder in the housing configured to direct a laser beam toward the scene and generate data that is indicative of the distance to a target in the scene, a second display in the housing operatively connected to the distance finder for displaying distance data, and a switch for storing image data in the memory.

Other embodiments include a projector in the housing for projecting the data displayed by the second display onto the image sensor to thereby capture the image data of the scene and displayed distance data together.

DESCRIPTION OF THE DRAWINGS

FIG. 2 is a left side view of the apparatus shown in FIG. 1;

FIG. 3 is a front view of the apparatus shown in FIG. 1;

FIG. 4 is a perspective view similar to FIG. 1, of the target finding apparatus shown with a different laser range finder than is shown in FIG. 1, with the target finding apparatus being shown in its closed inoperative position;

FIG. 7 is a perspective view of a portion of the target finding apparatus and particularly illustrating the link lever component of the apparatus shown in FIG. 1;

FIG. 8 is a perspective view of the link lever and link frame components of the apparatus shown in FIG. 1;

FIG. 17 is a side view, partially in section, illustrating an alternative embodiment of a data projector that is used to merge data from a laser range finder with an image acquired by the target finding apparatus and shown in a first position;

FIG. 18 is another view similar to FIG. 17, but shown in a second position; and

DETAILED DESCRIPTION OF THE PREFERRED EMBODIMENTS

Figure 1:
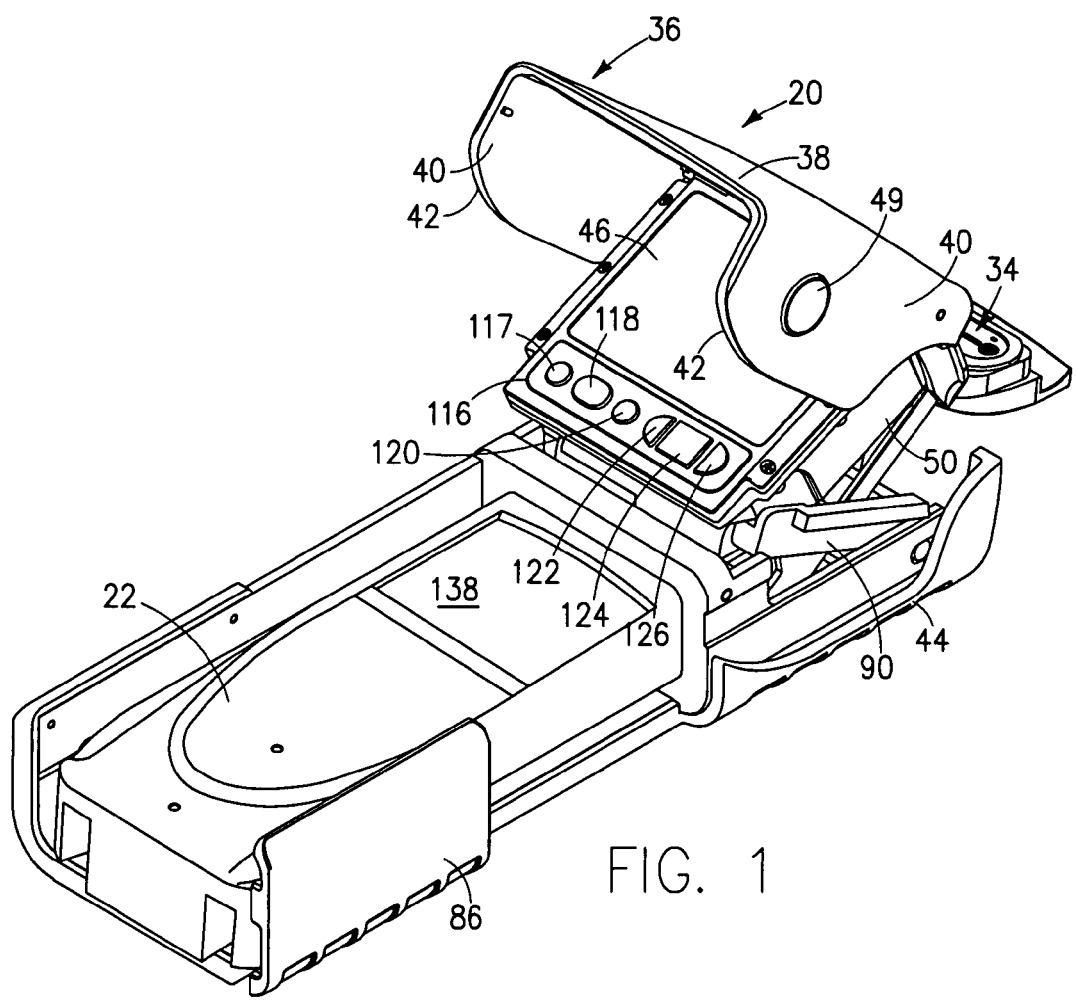
FIG. 1 is a right rear perspective view of a video target finding apparatus shown in an open operative position coupled with a laser range finder.

Broadly stated, preferred embodiments of the present invention are directed to a target finding apparatus (hereinafter referred to as a target finder) as well as a method of locating targets, measuring the distance to the targets and merging video images together with measurement data to provide a reliable record of such activity. It should be understood that the target finder is preferably used with a laser measurement device or range finder that has a compact design, preferably configured to be small enough to be held in the palm of one's hand, such as the RoboToolz Model RT-9000 RoboTape® laser distance measure device. Similarly, the DISTO™ range finders that are marketed under the Leica® brand can be used together with embodiments of the target finder described herein.

It should be understood that while the target finder may be marketed separately for use with either the RoboTape® range finder or the Leica® DISTO™ range finders, it should be understood that other embodiments may incorporate a range finder in its design so that a single unitary product is sold which performs the functions that are achieved by the target finder and the range finder. If such a unitary product is desired, certain aspects of several of the embodiments of the present invention may be simplified, such as elimination of the data projecting feature to be described.

As previously described, during operation of laser range finders, a laser beam is emitted from the unit which is directed to a target to be measured and bright sunlight can diminish the visibility of the light beam so that the operator can have difficulty in identifying the exact target for which measurement information may be being displayed.

Embodiments of the present invention incorporate a digital camera that is preferably a video digital camera that has a CMOS image sensor, although a CCD sensor may alternatively be used. The image sensor preferably has at least five megapixels and circuitry for executing a digital zoom capability so that sufficient resolution is maintained to be able to see a laser spot on a target at distances up to several hundred meters. It is desirable that the target finder have cross hairs on a digital display of the acquired image so that the cross hairs can define the location of the beam spot and thereby help to identify the target.

Since the laser range finder may be a separate product that is coupled to the target finder, there is necessarily some amount of parallax present because the laser is emitted to a target along a path that differs slightly from the center of the image acquired by the video camera. The target finder is designed and configured to carry out a calibration process so that the cross hairs of the acquired image that is displayed on a target finder display corresponds to the location of the laser beam spot when calibration is completed. The calibration is preferably carried out by performing a pixel shift of the image area within the CMOS sensor pixel array so that the laser beam spot is effectively shifted to a position located at the intersection of the cross hairs on the display.

Preferred embodiments of the laser finding device embodiments of the present invention which when coupled to a laser range finder have the capability of acquiring and storing an image of a view which also includes the laser beam spot at the target and this image can be stored to provide a record of the event. Since the previously described laser range finders also have a display which shows an image of measurement data, preferred embodiments of the target finder are configured to project this displayed measurement data onto the image sensor that also receives the image of the scene. This can be written into onboard memory of the target finder to provide a record of the measurement data as well as the target which was measured. The possibility of user error is greatly reduced because the record eliminates the need for making copious notes regarding a particular measurement. The manner in which the data is merged can vary to include a digitally zoomed in portion of the image with the cross hairs and laser beam spot or a zoomed out image or even a combination of the two. Other embodiments may provide pairs of files, one being the measurement data file and the other the image of the scene data file which can be saved with a file designation or filing procedure that identifies them as related pairs of files.

Figure 5:
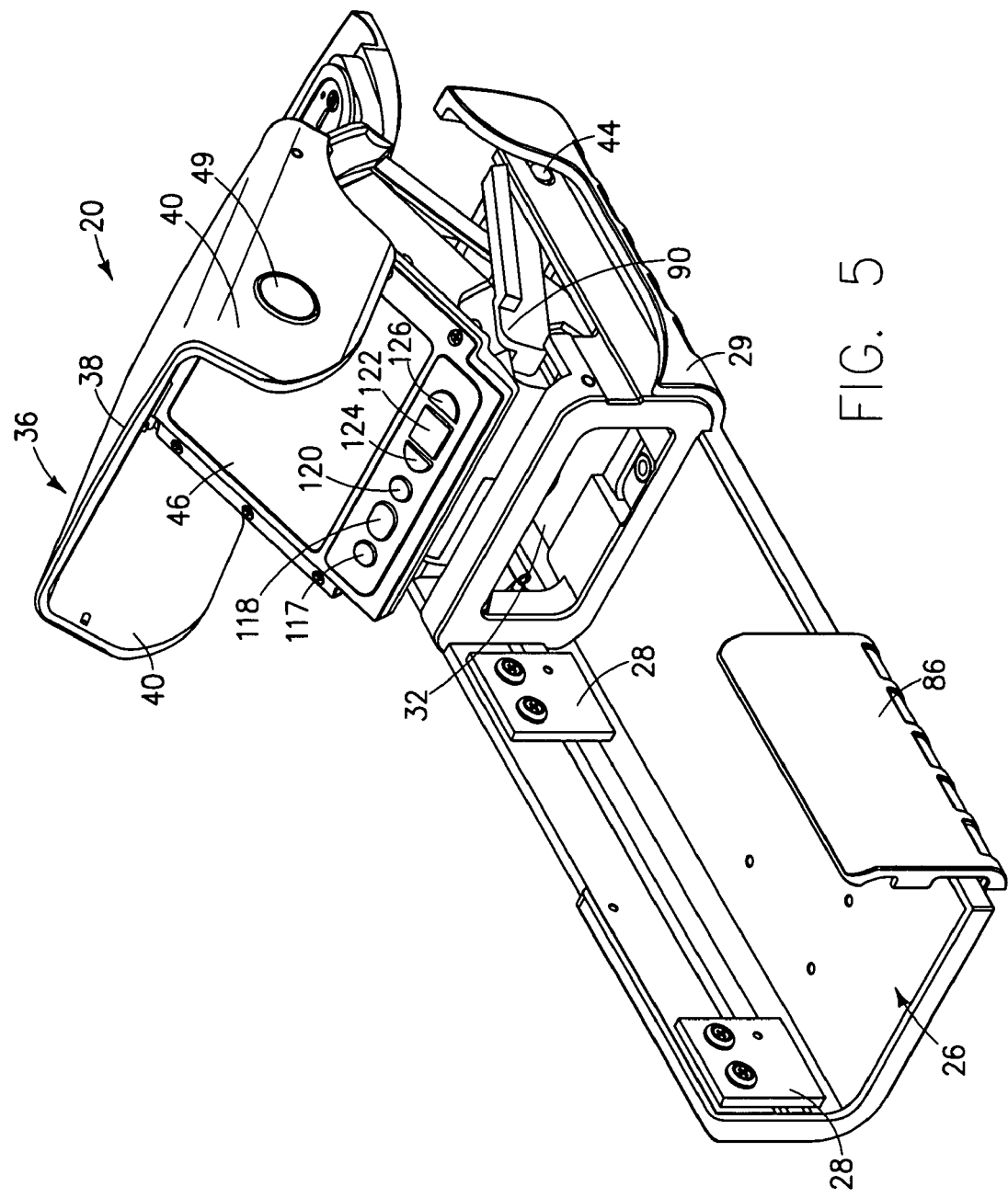
FIG. 5 is a perspective view similar to FIG. 1 of the target finding apparatus, shown in an operative position, but without a laser range finder coupled to the 1 apparatus.

Turning now to the drawings, and particularly FIGS. 1-4, a target finder 20 is shown together with a Leica® DISTO™ laser distance meter 22 in FIG. 1 and with a RoboTape® RT-9000 laser distance measure 24 as shown in FIG. 4. The target finder 20 is shown in its open and operating position in FIGS. 1-3 and 5 and in its closed non-operating position in FIG. 4. As shown in FIG. 5, the target finder 20 has a compartment, indicated generally at 26, configured and sized to receive one of these range finders in close fitting relationship. The left side of the compartment 26 have datum surfaces 28 which contact the left side of either of the range finders to firmly and correctly position them within the compartment 26. A datum surface 29 is configured to bear against the front end of the range finder.

Both range finders emit a laser beam forwardly from an emitter 30 at the front end such as shown for the Leica DISTO™ range finder 22 as shown in FIG. 3. In this regard, when the target finder 20 is in its operating position, the front portion of the compartment has a passage, indicated generally at 32 in FIG. 5, through which the range finder laser beam may travel without interference. The passage 32 also defines a storage compartment for components of the range finder when it is placed in its closed position as shown in FIG. 4. The front part of the target finder 20 has a scissors type folding mechanism, indicated generally at 34, which includes an outer hood, indicated generally at 36, that has a top surface 38, as well as two side walls 40 that have a curved bottom edge 42 that nests in a complementary recess 44 in the side wall of the front portion of the target finder 20.

The hood 36 provides a protective cover for the interior of the target finder and shields direct sunlight from a LCD display 46 that displays an image of a scene that is acquired by a video camera module 48 as shown in FIG. 3. The side walls 40 of the hood also have depressions 49 which enables a user to grip the hood when target finder is closed and lift the hood up to open the target finder to its open operating position. The LCD display 46 is mounted to a top surface of a box like compartment 50 (see FIGS. 2 and 16) that is configured to store preferably four batteries that power the camera, control circuitry and LCD display 46.

Figure 6:
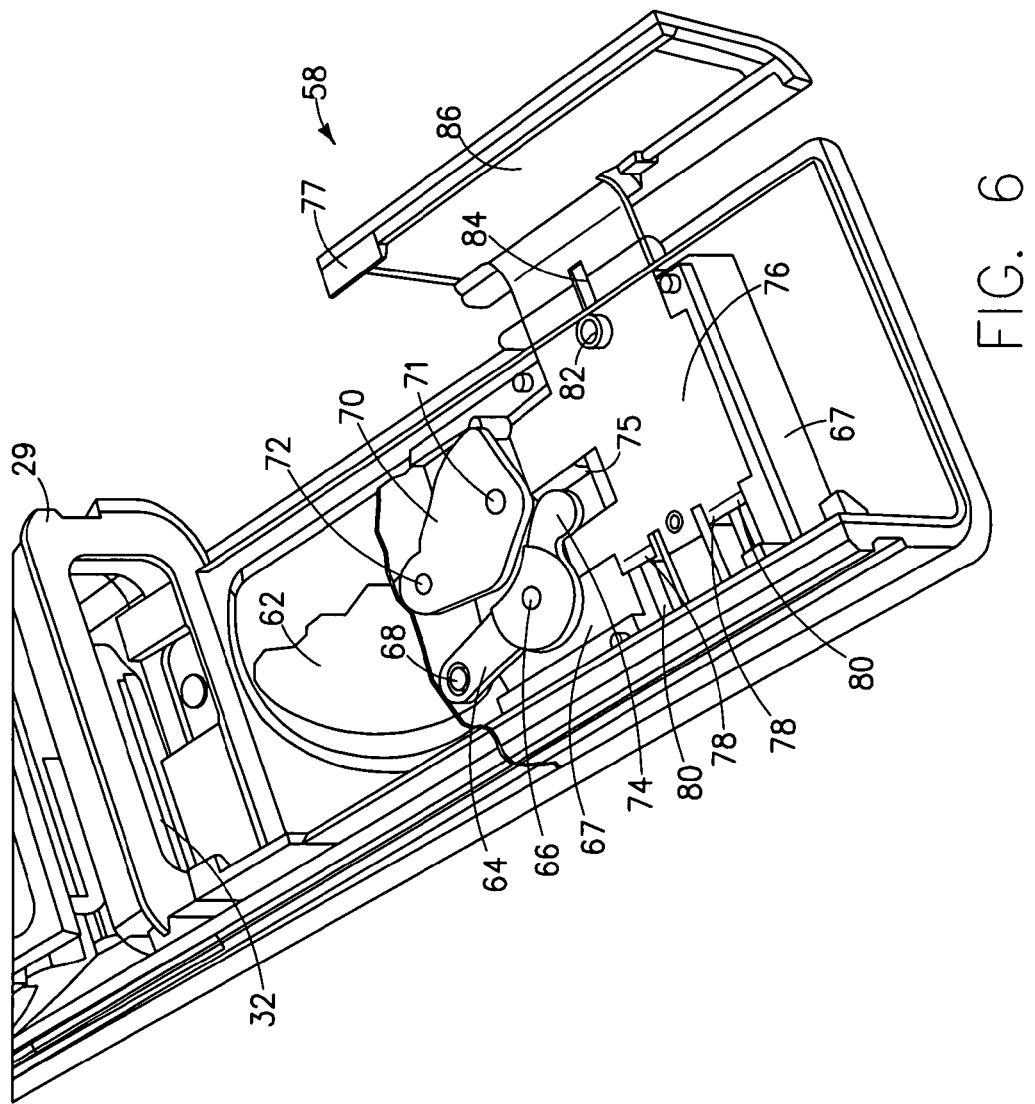
FIG. 6 is a partial perspective view with portions removed and other portions shown being transparent illustrating the target finding apparatus side clamping mechanism shown in a loading position for receiving and coupling a laser range finder to the target finding apparatus.
Figure 9:
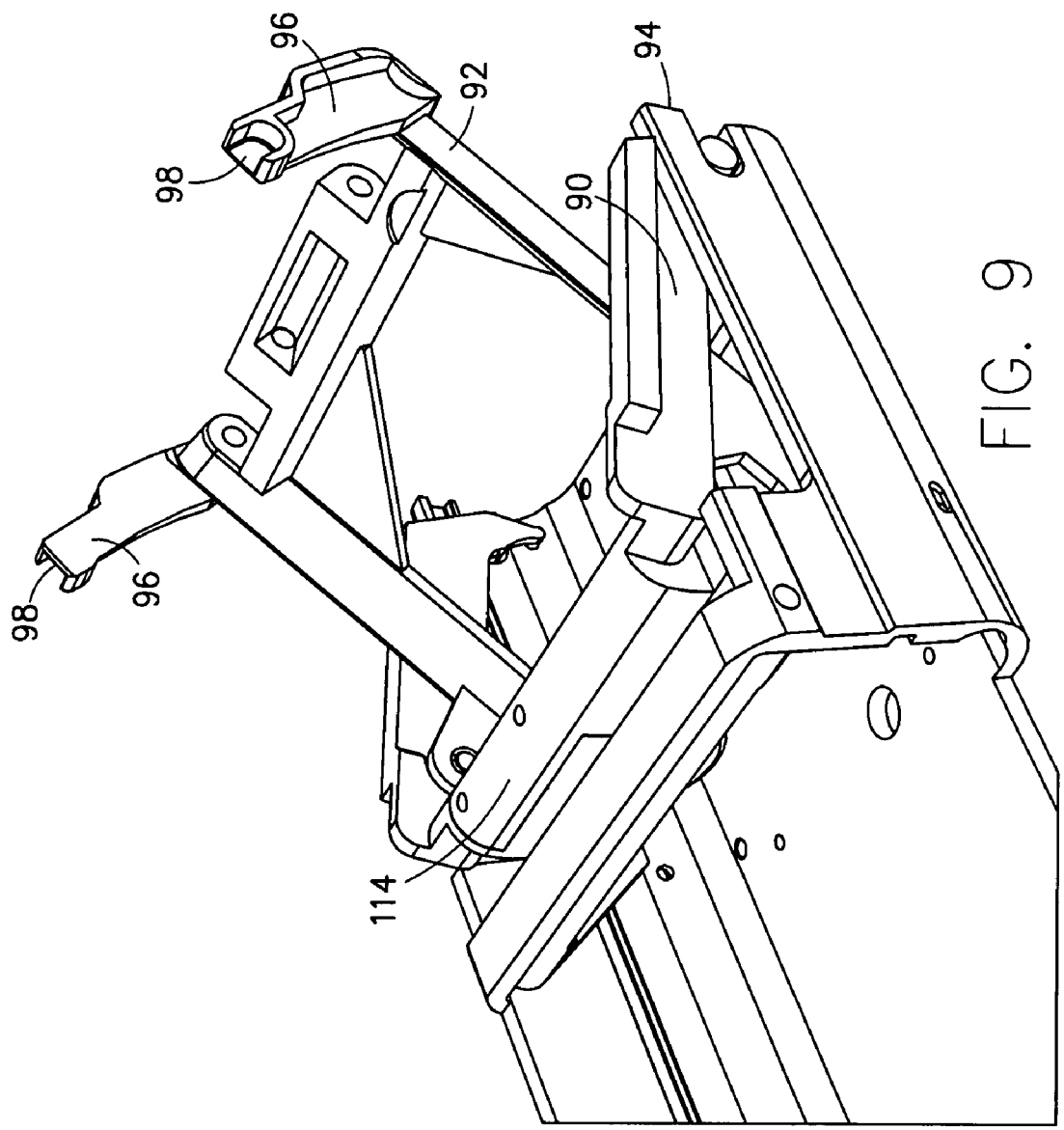
FIG. 9 is a perspective view illustrating the link lever and link frame shown in FIGS. 7 and 8, together with a mounting bracket, with the combination shown in an open or operative position.
Figure 11:
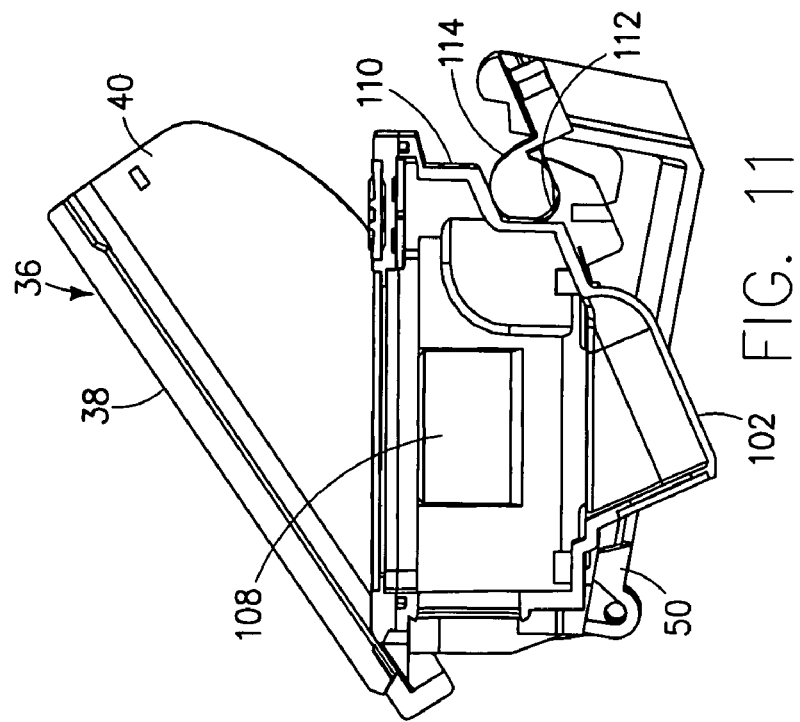
FIG. 11 is another cross-section similar to FIG. 10 but illustrating the apparatus in a middle or neutral position.
Figure 10:
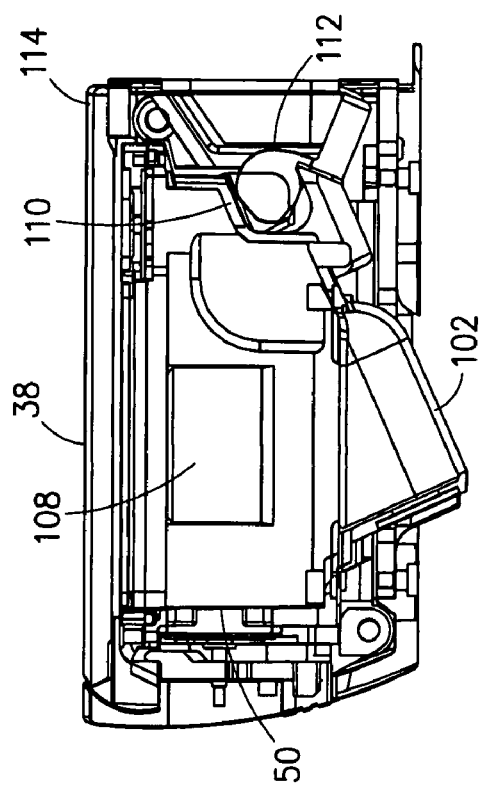
FIG. 10 is a cross-section taken generally along the center line of the length of the target finding apparatus and shown with portions removed and in a closed or inoperative position.

When the folding mechanism 34 is folded to its closed position such as shown in FIG. 4, the camera 48 is lowered into a small compartment 52 that protrudes from the general plane of a bottom wall 54. Another lower compartment 56 is also provided for containing a side clamping mechanism, indicated generally at 58, that is shown in FIG. 6. Another lower extension 60 is located between the compartments 52 and 56 which has a recess in which a grip member 62 is located for operating the side clamp mechanism 58.

The side clamp mechanism includes a lever 64 that rotates around pivot axis 66 that is secured to a base structure 67, with the end of the lever 64 being pivotally connected to the grip member 62 by pivot connection 68. The grip member 62 is also connected to a plate 70 by pivot connection 72. The plate 70 has a pivot connection 71 secured to base structure 67 at its opposite end. The configuration of the plate 70 enables the grip member 62 to be moved from right to left as shown in FIG. 6 to cause the lever 64 to rotate around the pivot axis 66. At the opposite end of the lever 64 a circular end 74 that engages a cutout portion 75 of a sliding plate 76 which has two downward spaced extensions 78 on the left end of the plate 76 that cooperate with rails 80. A screw 82 attached to the base structure 67 is located in an elongated slot 84 in the sliding plate 76 so that the plate is constrained by the screw 82 and rails 80 to move in a straight line, i.e., in left or right direction as shown in FIG. 6. It should be understood that when the grip member 62 is moved to the left, the sliding plate will be extended to the right as shown in FIG. 6.

The plate 86 is attached to or merges with a vertical side wall that is configured to engage the right side of a range finder 22 or 24 that is placed in the compartment 26. Springs that are not shown urge the sliding plate 76 to the left so that the side wall 86 biases the range finder toward the datum surfaces 28. The side wall 86 has an inward angled extension 77 configured to apply a downward force on the top of the target finder so that the range finder is firmly held in place.

With regard to the scissors-type folding mechanism 34, it is shown in FIGS. 7-12 and includes a link lever 90, shown in FIG. 7, which is assembled with a link frame 92 as shown in FIG. 8. These two components are then mounted in a mounting bracket 94 shown in FIG. 9 with the folding mechanism 34 in its extended up position. The link frame 92 has a transverse and upwardly extending portion 96 on opposite sides thereof which have recesses 98 at the outer end thereof to which the hood 36 is pivotally attached.

Figure 12:
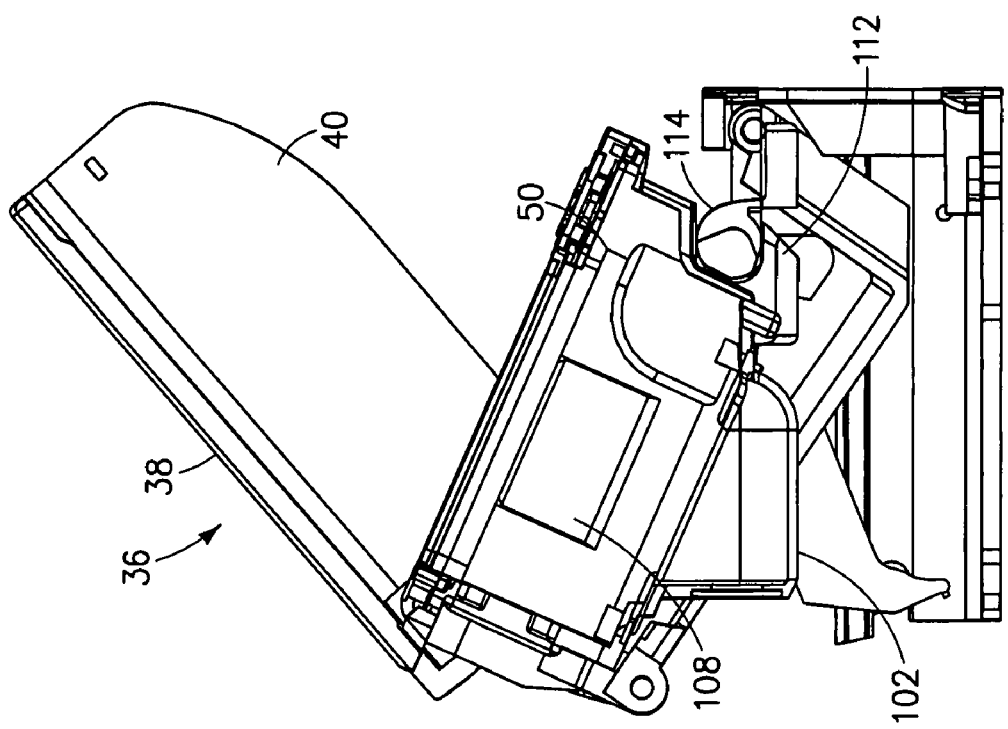
FIG. 12 is another cross-section similar to FIGS. 10 and 11, but shown with the apparatus in an open or operative position.

As shown in FIG. 12, the box-like compartment 50 fits within the link frame 92 and it has a lower extension 102 for containing the camera module. A printed circuit board 104 (see FIG. 16) is provided and a CMOS imaging sensing device 106 is mounted to the printed circuit board 104, as are control circuit components including a processor 105 and a memory 107. The enclosure 50 has a far wall 108 that is visible in the cross section views of FIGS. 10, 11 and 12 and a rear wall 110 that has a non-circular recess 112 in which a noncircular bridge portion 114 of the link lever 90 shown in FIG. 7 fits. The shape of the bridge portion 114 and recess 112 are configured to define an over the center spring which holds the folding mechanism 34 and video camera module 48 down when it is in the stored position and holds them up when it is in the operating position.

To operate the camera module, a keypad 116 is provided and is connected to the camera module 48 and circuit board 104 containing the CMOS image sensor 106 as well as the electronics for controlling the camera and for processing the data. The keypad 116 preferably includes a record or capture switch 117 for capturing an image for necessary processing in the processor 107 and for ultimately storing it in the memory 107, a power switch 118, a calibration switch 120, a toggle switch 122 that can be actuated in an up or down position, as well as switch 124 and 126 located on each side of the switch 122. While the switches 122, 124 and 126 are shown to be directional switches, their function changes depending upon whether it is normal operation or if the target finder 20 is being calibrated to a coupled range finder 22 or 24.

With regard to the operation of the camera module 48 during normal operation, the switch 122 can be activated to brighten the display 46 while switch 126 will dim it. When the toggle switch 124 is pressed in its upper position, it operates the zoom function to zoom in on a target, whereas in the down position, it will zoom outwardly. In this regard, it should be understood that while a mechanical zoom may be employed in the target finder 20, a digital zoom feature is preferred and is accomplished by electronically combining pixels in a manner that is well known to those of ordinary skill in the art and is a feature that is provided with many commercially available camera modules.

When the calibration switch 120 is activated, the switches 122, 124 and 126 have a different control function. In the calibration mode which is entered into preferably by pressing the calibration button a single time, it causes the direction buttons to selectively move the displayed image including the laser beam spot to align the cross hairs with a laser beam spot. This can be understood by viewing FIG. 13 which shows the screen 46 with a scene of a portion of a building when the unit is in the calibration mode. A laser beam spot is shown at 128 and is clearly not located in the cross hairs 130 which are in the center of the display. By pressing the direction switches 122, 124 and 126, the scene including the spot can be relatively moved into the intersection of the cross hairs, which is shown on the right portion of FIG. 19. When calibration has been completed, the calibration mode can be exited by merely pressing the calibration switch 120 again which causes the position to be stored in memory 107 that is provided on the printed circuit board 104.

Figure 13:
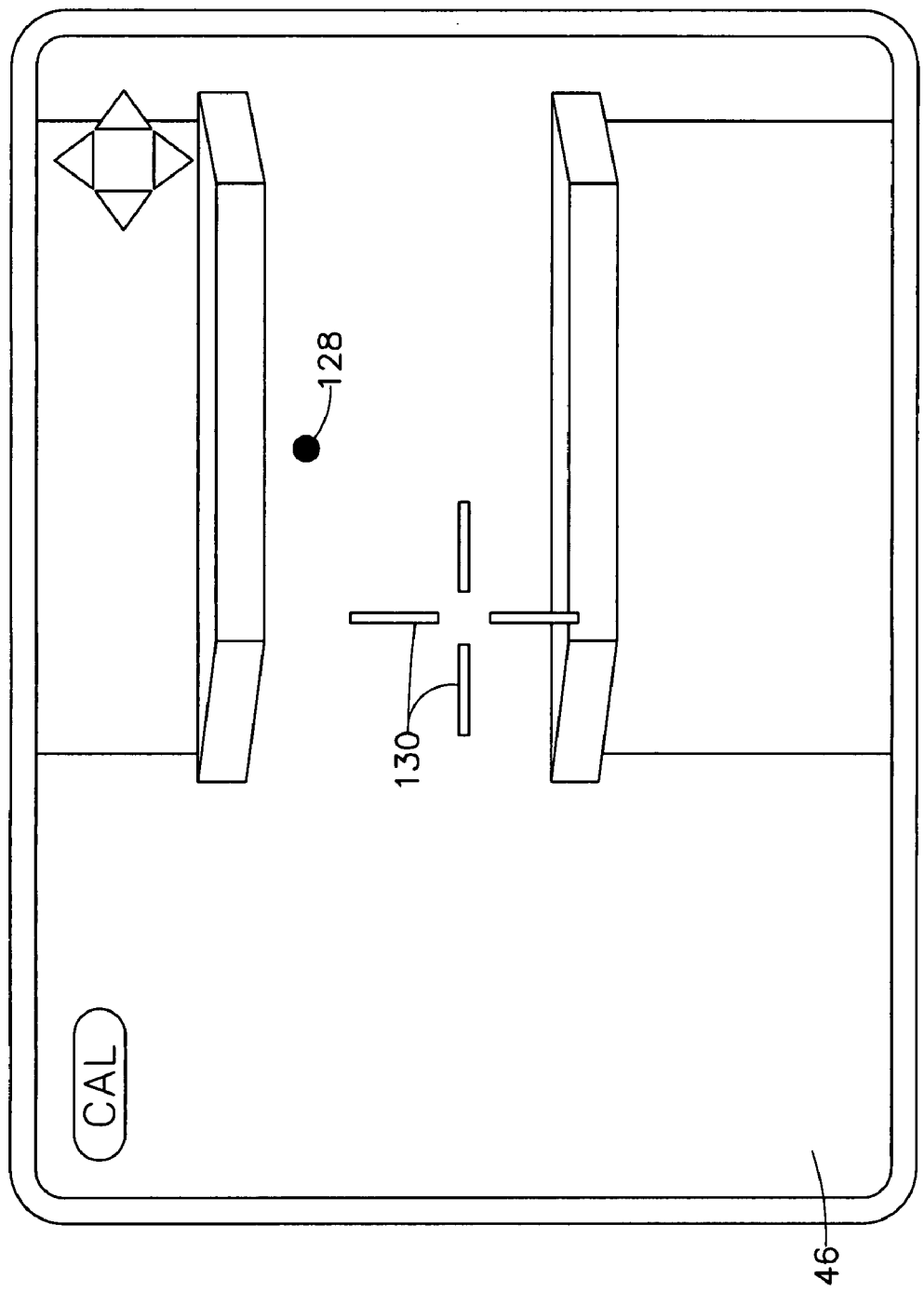
FIG. 13 is a diagrammatic view of a building shown on the display of the apparatus during calibration of the apparatus, particularly illustrating the cross hairs and position of the laser spot in a scene, the apparatus being in an uncalibrated state or condition.

It should be understood that the camera 48 is offset relative to the range finder beam being emitted as indicated in FIG. 3 by comparing the camera 48 with the emitter 30 of the Leica DISTO™ range finder. That distance is approximately 23 mm. Therefore there is a parallax issue that exists for all range finders, and will generally vary depending upon which range finder that is used. It is preferred that the calibration occur at a distance of preferably at least 20 meters or more by using the directional switches 122, 124 and 126 which will move the laser spot 128 into the cross hairs 130 that are generated by the control electronics. The arrows in the upper right corner of the display shown in FIG. 13 are selectively highlighted or otherwise uniquely identified, depending upon which of these switches is being depressed.

Figure 14:
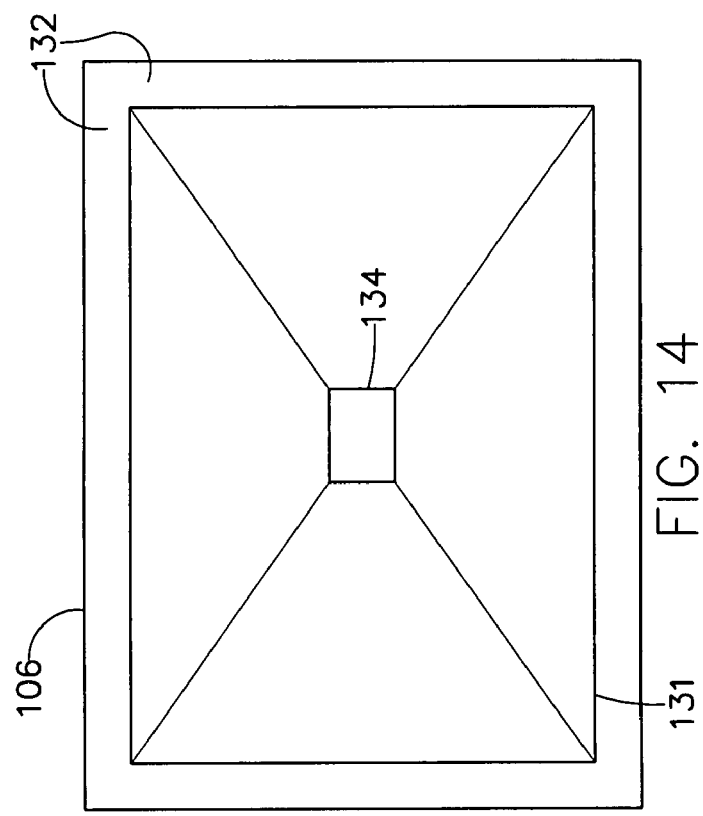
FIG. 14 is a diagrammatic representation of a five megapixel image sensor particularly illustrating an imaging area and a border that can be used as a calibration allowance.

It is preferred that a CMOS image sensor 106 having at least five megapixels be used, but a greater density may also be employed which would increase the definition of the digital zoomed image or permit increased zoom capability. While CMOS image sensors are preferred because of their reduced cost compared to charge coupled device sensors, the latter can certainly be used if desired. As shown in FIG. 14, a five megapixel CMOS image sensor having a pixel matrix of 2592×1944 is illustrated by the outer peripheral line. An image area 131 of a lesser number of pixels is actively used during operation and a pixel border 132 of approximately 170 pixels that provides an allowance for calibration of approximately 2° of misalignment.

Figure 15:
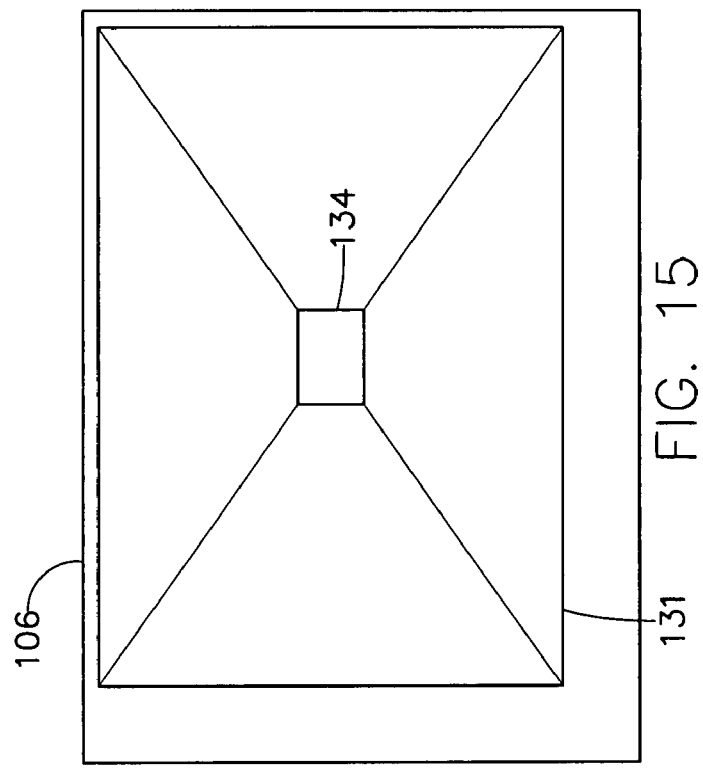
FIG. 15 is a view similar to FIG. 14 but illustrating a representative shift of the imaging area to achieve calibration.
Figure 19:
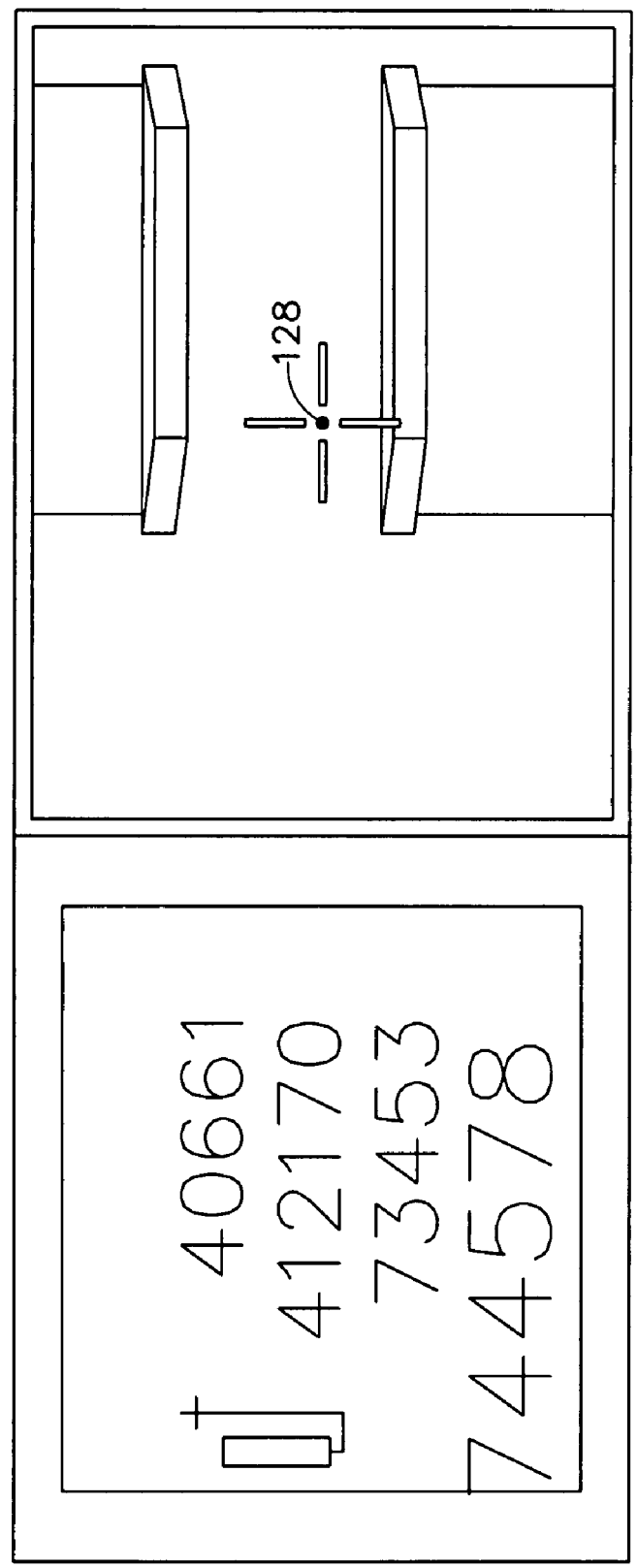
FIG. 19 is a diagrammatic representation of a merged image that includes data that is projected from a laser range finder as well as a video image of a scene acquired by the target finding apparatus.

With a maximum digital zoom of 320×240 pixels, which must be compatible with the LCD 46 that is used, it is shown in the center of the screen and is indicated at 134. During calibration, activating the pushbuttons 122, 124, 126 will cause the image area 131 to be shifted from its default position shown in FIG. 14 where the border 132 of pixels has a uniform width, to another position, such as is shown in FIG. 15 where the width of the top and right portions of the border are much smaller as a result of the shifting. It is intended that when the image area 131 has been shifted to that shown in FIG. 15, the cross hairs 130 will be coincident with the laser spot 128 such as shown in FIG. 19. With the maximum digital zoom illustrated in FIG. 14, each CMOS pixel matches one addressable LCD pixel and therefore no scaling or interpolation is needed.

As previously mentioned, when calibration is performed in bright sunlight, it can be difficult to see the laser spot during calibration. However, with a pixel size of 2.2×2.2 micrometers, the image size of a laser spot at 20 meters distance projected onto the CMOS sensor by a 10.8 mm lens is approximately 5.4×8.1 micrometers which equates to at least eight pixels which is usually visible. While laser range finder manufacturers sell accessories, such as the red glasses, which operate to increase the visibility of the red spot, such a red bandpass filter 133 may be provided for mounting forwardly of the lens as shown in FIGS. 17 and 18. It should be appreciated that other color lasers, such as blue or green lasers can be used for example, in which event a bandpass filter of the same color would be used.

The preferred embodiments of the present invention utilize electronic techniques for achieving a comparable effect. The above referenced CMOS imaging device contains 5,174,400 pixels arranged in a color filter layout. The color filters are in a Bayer pattern with the primary color BG/GR array arranged in line alternating fashion. Of the total number of pixels, 5,080,384 are active with the other pixels being used for black level calibration and interpolation. The output of the blue and green pixels during calibration is greatly attenuated which has a comparable effect of providing a red band pass filter on the red output. Thus, by this technique, the visibility of the red spot can be accentuated during the calibration process. Similarly, if blue or green lasers are being used, attenuation of the outputs of the other two colors that are not being used would be done during the calibration. When the calibration button 120 is pressed again to remove the target finder 20 from its calibration mode, the attenuation of the blue and green output signals is turned off.

The Leica DISTO™ range finder 22 as well as the RoboTape® range finder 24 each has a display 138 which displays information relative to measurements that are taken and such information may take the form as shown in FIG. 19. Both of these range finders are commercially available and the operating manual for each of them is incorporated by reference herein and will be submitted in an Information Disclosure Statement filed in the United States Patent and Trademark Office. Linking the image of the video target finder with the image of the data display 138 and storing the linked images together for record keeping purposes provides a significant advantage over a user merely keeping a written log of such information. Even if the measurement data is individually stored, without the merger, there is no conclusive record of what the target measurement actually was for.

Figure 16:
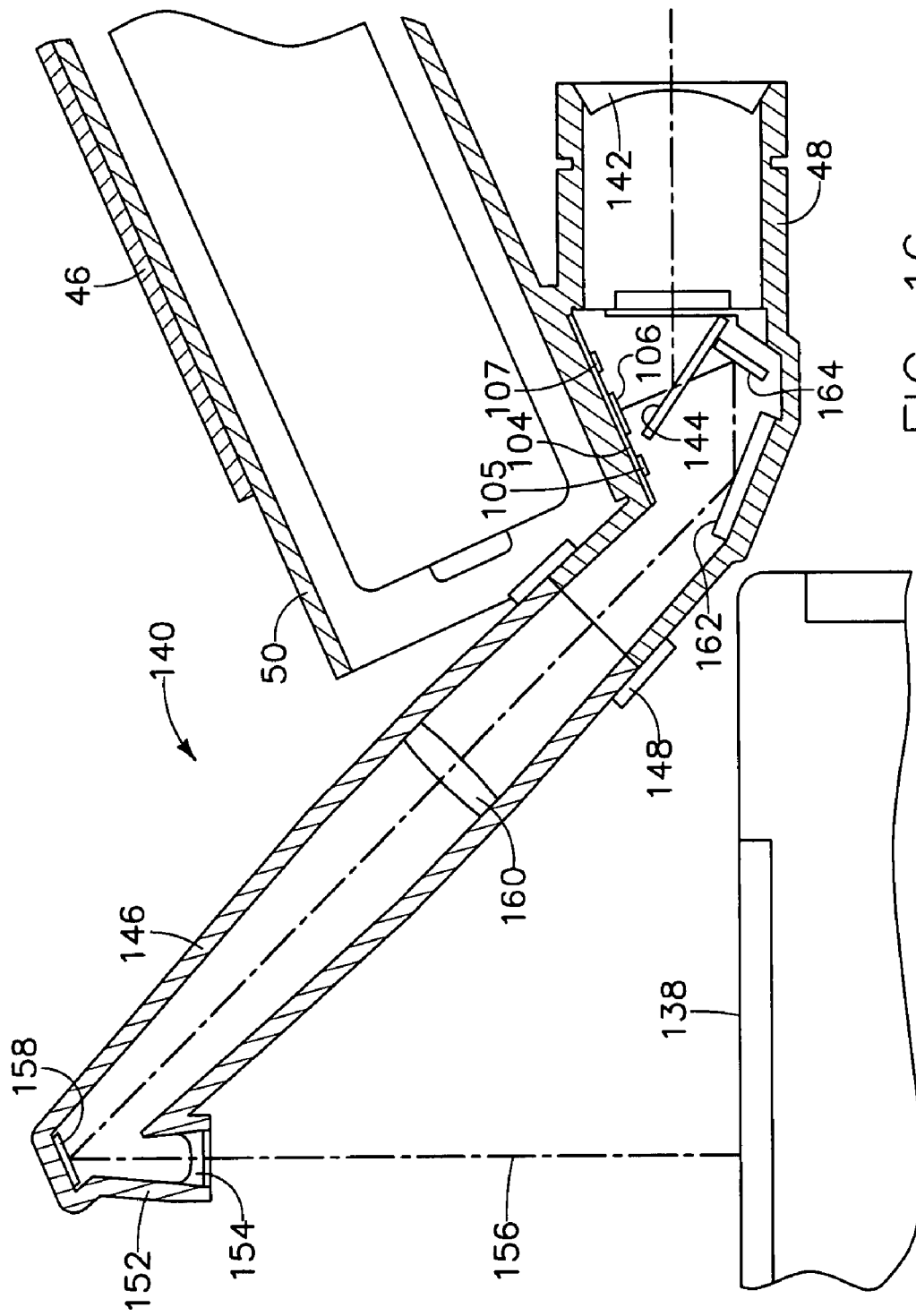
FIG. 16 is a side view, partially in section, illustrating a data projector for merging data from a laser range finder display with a video image of a scene acquired by the target finding apparatus.

A preferred embodiment of the present invention incorporates a data projector, indicated generally at 140, which is integrated with the video camera module 48 images that are captured by the CMOS image sensor 106. Referring to FIG. 16, the image acquired through a lens 142 of the camera 48 is directed to a half mirror 144 where it is reflected onto the CMOS sensor 106. The data projector 140 has a hollow elongated tubular portion 146 that has a cylindrical fitting 148 that snugly fits over a base tubular portion 150 so that the portion 146 can be removed from the base tubular portion 150. The base portion 150 is preferably integrated with the structure of the camera, printed circuit board 104, CMOS image sensor 106 and mirror 144.

The tubular portion 146 has an outer end portion 152 that contains a negative plastic aspheric lens 154 that acquires an image along line 156 from the display 138 is reflected off of a mirror 158 through a positive plastic aspheric lens 160 onto mirrors 162 and 164 where it is directed through a half mirror portion of the mirror 144 onto the CMOS image sensor 106. In this regard, the half mirror 144 means that only half of the surface is coated and reflective for transferring the image from the camera module 48 and the portion through which the image from the display 138 is transparent. In this way, the image on the display screen 138 and the image from the camera 48 can be simultaneously captured by the CMOS 106. Given that the preferred CMOS sensor is 20% wider than its height, it is preferred that the image from the range finder occupy one side portion and that the image from the camera occupy the other. However, it should be understood that different configurations could be used if desired. In this regard, the images can be partially or completely over laid relative to one another, with one or the other of the images having at least some degree of transparency An alternative preferred embodiment may utilize a mirror 144 that is pivoted along its bottom surface so that it can be moved between two positions. In one position the image from the camera 48 can be directed to the CMOS 106 and the image from the range finder display 138 is blocked as shown in FIG. 17. When the mirror 144 is pivoted to the position shown in FIG. 18, the image from the camera module 48 is blocked and the image from the range finder display 138 is reflected into the CMOS 106. A solenoid switching mechanism is preferably employed to rotate the mirror 144 to the appropriate position.

While it could be otherwise, it is preferred that the normal position be as shown in FIG. 17, wherein capture button 117 is depressed, which will cause the image of the camera to be captured, at which point the solenoid switching moves the mirror 144 to the position shown in FIG. 18 and the CMOS captures the image from the display 138 of the range finder. The two files are then be processed to merge them to form an image such as shown in FIG. 19. Software manipulation is therefore necessary to merge the two files together, although they could be separately maintained if identified as a pair.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. Apparatus for use with a portable handheld laser range finder configured to direct a laser beam toward a scene to measure the distance to a target in the scene and having a range finder display for displaying data, including data that is indicative of the distance to the target, said apparatus comprising:

a protective housing configured to receive and retain the range finder;

a camera module in said housing, said camera module including a lens mounted in a front end portion of said housing, and a light path through said lens to an image sensor;

an image sensor operatively connected to said camera module for receiving an image of a scene acquired by said camera module;

electronic memory for selectively storing data of said image of a scene acquired by said image sensor;
circuitry for controlling the operation of said image sensor and said memory;
a camera display in said housing operatively connected to said image sensor for receiving said image data and providing a visual display of said image of a scene;
a projector operatively connected to said housing for projecting said data displayed by the range finder display including indicia identifying the location of the target measured by the range finder onto said image sensor to thereby enable capture of said image data of said scene and displayed distance data together in said memory so that said image of said scene including the location of the target can be displayed together with said distance data on said camera display; and
a switch for storing said image data and said distance data in said memory, thereby providing a stored record of the distance to the target that is identified within the image of said scene.

2. Apparatus as defined in claim 1 wherein said projector has an elongated portion extending from the camera module over the range finder display and a multiply angled light path from above the range finder display through said elongated portion and a plurality of lenses and mirrors to said image sensor.

3. Apparatus as defined in claim 2 wherein a half mirror is positioned adjacent said image sensor and is configured to reflect the image data of said scene onto said image sensor and to transmit the range finder display image data through said half mirror, so that both said image data of said scene and the range finder display image data is simultaneously captured by said image sensor.

4. Apparatus as defined in claim 2 wherein a pivotable mirror is positioned adjacent said image sensor and is configured to reflect the image data of said scene onto said image sensor and to block the range finder display image data from reaching said image sensor when pivoted into a first position, and to enable said the range finder display image data to be directed to said image sensor and block said image data of said scene when pivoted to a second position.

5. Apparatus as defined in claim 1 wherein said image sensor comprises a multiplicity of pixels arranged in a x by y matrix, said image having a predefined center coordinate and an image area of pixels surrounded by a border having a width of at least a predetermined number of pixels, said control circuitry being configured to shift said predefined center coordinate and said image area within said matrix, so that said image area can occupy a portion of said border for calibration purposes.

6. Apparatus for use with a portable handheld laser range finder configured to direct a laser beam toward a scene to measure the distance to a target in the scene and having a range finder display for displaying data, including data that is indicative of the distance to a target, said apparatus comprising:
a protective housing configured to receive and retain the range finder;
a camera module in said housing, said camera module including a lens mounted in a front end portion of said housing, and a light path through said lens to an image sensor;
an image sensor operatively connected to said camera module for receiving an image of a scene acquired by said camera module, said image sensor comprising a multiplicity of pixels arranged in a x by y matrix, said image having a predefined center coordinate and an image area of pixels surrounded by a border having a width of at least a predetermined number of pixels, said control circuitry being configured to shift said predefined center coordinate and said image area within said matrix, so that said image area can occupy a portion of said border for calibration purposes, wherein said border width has a sufficient number of pixels to permit at least 2 degrees of angular adjustment of said image area of pixels within said pixel matrix;
electronic memory for selectively storing data of said image of a scene acquired by said image sensor;
circuitry for controlling the operation of said image sensor and said memory;
a camera display in said housing operatively connected to said image sensor for receiving said image data and providing a visual display of said image of a scene; and
a switch for storing image data in said memory.

7. Apparatus as defined in claim 6 wherein said image sensor has at least 5 megapixels and the width of said border is at least approximately 170 pixels.

8. Apparatus as defined in claim 1 wherein said image sensor is a CMOS imaging sensor having at least 5 megapixels.

9. Apparatus as defined in claim 8 wherein said laser beam is selected to be one of red, green or blue and said imaging sensor has an approximately equal number of red, green and blue color filters for said pixels to provide red, green and blue outputs, said control circuitry being operative to attenuate the outputs of the non-selected color during a calibration operation to increase the visibility of a laser spot in an acquired scene.

10. Apparatus as defined in claim 5 wherein said control circuitry is configured to selectively generate overlay indicia identifying said center coordinate of said scene on said camera display.

11. Apparatus as defined in claim 10 wherein said indicia comprises a cross hair configuration that identify said center coordinate.

12. Apparatus as defined in claim 1 wherein said camera display is a LCD display.

13. Apparatus for use with a laser range finder configured to direct a laser beam toward a scene to measure the distance to a target in the scene and having a range finder display for displaying data, including data that is indicative of the distance to a target, said apparatus comprising:
a protective housing;
a camera module in said housing, said camera module including a lens mounted in a front end portion of said housing, and a light path through said lens to an image sensor;
an image sensor operatively connected to said camera module for receiving image acquired by said camera module;
electronic memory for selectively storing data of images from said image sensor;
circuitry for controlling the operation of said image sensor and said memory;
a camera display in said housing operatively connected to said image sensor for receiving said image data and providing a visual display of said image; and
a switch for storing image data in said memory;
wherein said housing comprises an expandable and retractable top front portion that is mounted to a base portion by a folding mechanism, whereby when said top front portion is in an open position, said camera display is visible beneath said top front portion and said camera is positioned to acquire an image, and whereby when said top front portion is in a closed position, said top front portion is retracted and said camera and camera display are enclosed in said housing.

14. Apparatus as defined in claim 13 wherein said top front portion contains said camera module, said camera display, said control circuitry, a battery compartment, said camera lens and a key pad for operating said camera module.

15. Apparatus as defined in claim 13 wherein said housing has a compartment rearwardly of said top front portion configured to receive the range finder therein, said housing having a side clamp that is movable outwardly from one side of said housing for loading the range finder in said compartment, said side clamp having at least one spring for biasing said side clamp inwardly to firmly hold the range finder in said compartment.

16. Apparatus as defined in claim 1 wherein said laser beam is one of red, green and blue, said apparatus further comprising a bandpass filter of the same color that is selectively moveable into and out of said light path of to filter the image acquired by said image sensor.

17. Apparatus as defined in claim 1 wherein said control circuitry is configured to control said image sensor to provide a digital zoom function to selectively enlarge a portion of an acquired scene as displayed on said camera display.

18. Apparatus as defined in claim 17 wherein said camera display is an LCD display comprising 240 by 320 pixels, said maximum enlargement of said enlarged portion has one pixel of said image sensor corresponding to one pixel of said LCD.

19. Apparatus as defined in claim 1 wherein said image data from said image sensor is stored in a predetermined file and said distance data are stored in a predetermined companion file, whereby the location and/or names of the two files identify the files as being linked together.

20. Apparatus for finding a target and measuring the distance to the target, comprising:
   a protective housing;
   a camera module in said housing, a lens mounted in a front end portion of said housing, and a light path through said lens;
   an image sensor configured to acquire an image from said light path through said lens of said camera module and generate image data of an acquired image;
   a first display in said housing operatively connected to said image sensor for receiving said image data and providing a visual display of said image;
   electronic memory operatively connected to said image sensor for selectively storing image data of images from said image sensor;
   control circuitry for controlling said image sensor and electronic memory to selectively acquire image data of a scene and store the same;
   a laser distance finder in said housing configured to direct a laser beam toward said scene and generate data that is indicative of the distance to a target in said scene;
   a second display in said housing operatively connected to said distance finder for displaying said distance data;
   a projector operatively connected to said housing for projecting said data displayed by said second display including indicia identifying the location of the target measured by the range finder onto said image sensor to thereby enable capture of said image data of said scene and displayed distance data together in said memory so that said image of said scene including the location of the target can be displayed together with said distance data on said first display; and
   a switch for storing said image data and said distance data in said memory, thereby providing a stored record of the distance to the target that is identified within the image of said scene.

21. Apparatus for finding a target and measuring the distance to the target, comprising:
   a protective housing;
   a camera module in said housing, a lens mounted in a front end portion of said housing, and a light path through said lens;
   an image sensor configured to acquire an image from said light path through said lens of said camera module and generate image data of an acquired image;
   a first display in said housing operatively connected to said image sensor for receiving said image data and providing a visual display of said image;
   electronic memory operatively connected to said image sensor for selectively storing image data of images from said image sensor;
   control circuitry for controlling said image sensor and electronic memory to selectively acquire image data of a scene and store the same;
   a laser distance finder in said housing configured to direct a laser beam toward said scene and generate data that is indicative of the distance to a target in said scene and data indicative of the location of said beam relative to said target;
   a second display in said housing operatively connected to said distance finder for displaying said distance data;
   a projector in said housing for projecting said data displayed by said second display including indicia identifying the location of the target measured by the range finder onto said image sensor to thereby capture said image data of said scene and displayed distance data together; and
   a switch for selectively storing said image data and said distance data in said memory, thereby providing a stored record of the distance to the target that is identified within the image of said scene.

22. A method of calibrating a laser spot produced by a laser range finder directed to a target to a predetermined coordinate within an image area captured by a target finder having a video camera with a megapixel image sensor having a matrix of pixels that is larger than the image area and a display for displaying the captured image area, the target finder having circuitry for controlling the operation of the image sensor and display and input controls to the circuitry, said method comprising:
   selectively providing inputs to the circuitry to shift the location of the pixels of the image area to move the image area so that the laser spot is displayed at the predetermined coordinate.

23. A method as defined in claim 22 wherein said inputs are provided by actuating directional switches which incrementally move said displayed image until said laser spot is displayed at the predetermined coordinate.

* * * * *